United States Patent [19]
Chen

[11] Patent Number: 5,831,972
[45] Date of Patent: Nov. 3, 1998

[54] METHOD OF AND SYSTEM FOR MAPPING SONET PERFORMANCE PARAMETERS TO ATM QUALITY OF SERVICE PARAMETERS

[75] Inventor: Cheng C. Chen, Carrollton, Tex.

[73] Assignee: MCI Communications Corporation, Washington, D.C.

[21] Appl. No.: 730,838

[22] Filed: Oct. 17, 1996

[51] Int. Cl.⁶ .................................................. H04L 12/56
[52] U.S. Cl. .......................................... 370/230; 370/252
[58] Field of Search .................................... 370/230, 234, 370/231, 232, 238, 252, 253, 255, 254, 228, 395, 400; 395/200.53, 200.55

[56] References Cited

U.S. PATENT DOCUMENTS

5,233,604  8/1993  Ahmadi et al. .......................... 370/238
5,335,222  8/1994  Kamoi et al. ........................... 370/230
5,357,507  10/1994 Hughes et al. .......................... 370/234
5,548,581  8/1996  Makrucki ............................... 370/253
5,581,544  12/1996 Hamada et al. ........................ 370/253
5,677,907  10/1997 Hamada et al. ........................ 370/253

Primary Examiner—Chau Nguyen

[57] ABSTRACT

A method of processing ATM service requests to a SONET network, wherein the customer requesting the service has specified certain ATM quality of service parameters, by mapping measured SONET performance parameters to predicted ATM quality of service parameters for an end-to-end path or connection through the SONET network. The system compares the predicted ATM quality of service parameters with the specified ATM quality of service parameters. Whenever at least one of the expected ATM quality of service parameters is worse than the corresponding specified ATM quality of service parameter, the system rejects the path or connection. The system may then either test an alternate path through the network or not provide the service.

16 Claims, 3 Drawing Sheets

METHOD OF AND SYSTEM FOR MAPPING SONET PERFORMANCE PARAMETERS TO ATM QUALITY OF SERVICE PARAMETERS

FIELD OF THE INVENTION

The present invention relates generally to data communications, and more particularly to a method of and system for processing ATM service requests to a SONET network, wherein the customer requesting the service has specified certain ATM quality of service parameters, by mapping measured SONET network performance parameters to expected ATM quality of service parameters.

DESCRIPTION OF THE PRIOR ART

Asynchronous transfer mode (ATM) is a cell-based switching and multiplexing technology that is designed to be a general-purpose, connection-oriented transfer mode for a wide range of services. ATM offers the potential to standardize on one network architecture defining the multiplexing and switching method, with synchronous optical network (SONET) providing a basis for the physical transmission standard for very high-speed rates.

The primary unit in ATM is the cell. An ATM cell comprises a fifty-three octet (byte) unit that includes a five byte (40 bits) header and a forty-eight byte (384 bits) payload. All information is switched and multiplexed in an ATM network in these fixed-length cells. The cell header contains the payload type, priority, and destination (by means of a virtual path identifier (VPI) and a virtual channel identifier (VCI)) of the cell, and a header error check. The payload contains the actual data to be transported.

An important aspect of ATM is the traffic contract, which is an agreement between an ATM customer and a network owner regarding various aspects of ATM cell flow through the network. The rates charged to the customer depend upon the traffic contract.

One element of the traffic contract is quality of service. Quality of service parameters provide objective measures of the outcomes of cells sent from an originating user to a destination user. Among the parameters measured with respect to ATM quality of service are lost cells, which are cells that do not reach their destination. A lost cell occurs when its header contains an uncorrected erroneous bit. ATM can detect and correct one errored header bit. Thus, a cell becomes lost when more than one of its bits are errored.

Another ATM quality of service parameter is errored cells. An errored cells is a cells that arrives at its destination with at least one errored bit in its payload. Since ATM does not correct payload bit errors, the occurrence of a single bit error in a payload results in an errored cell. Another parameter measured is severely errored cell blocks, which are blocks of cells in which more than M out of N cells are errored or lost.

Quality of service parameters are typically expressed in terms of ratios. Thus, lost cells are typically expressed as a lost cell ratio, which is the number of lost cells divided by the number of transmitted cells. The number of errored cells is typically expressed in terms of cell error ratio, which is the number of errored cells divided by the number of successfully transmitted cells plus the number of errored cells. Finally, the number of severely errored cell blocks are typically expressed in terms of a severely errored cell block ratio, which is the number of severely errored cell blocks divided by the total transmitted cell blocks.

Since the traffic contract and the rates charged to customers are based upon quality of service parameters, the owner of the network in effect guarantees that it will provide a customer a certain level of quality of service parameters.

The primary unit of SONET transport is the block or frame. A SONET frame comprises a synchronous payload envelope (SPE) and multiple overhead elements. The SPE contains the actual data that is transported. SONET transmits data at the rate of 8000 frames per second, or one frame each 125 microseconds. Thus, the number of bits per frame depends on the bandwidth. At the STS-1 rate of 51.84 Mbps, each frame contains 6264 payload bits.

SONET networks carry substantial traffic that is not ATM. A SONET network transport blocks or frames of bits that may or may not include ATM cells. The owner of a SONET network monitors performance parameters, but the SONET performance parameters are different from the ATM quality of service parameters.

The performance parameters that the SONET network owner measures include code violations, errored seconds, and severely errored seconds. An errored second is defined as a one second period during which at least one errored block is transmitted. An errored block is a SONET block having at least one errored bit. A severely errored second is defined as a one second period during which 30% or more of the blocks transmitted are errored. Thus, at the STS-1 rate, an errored second occurs whenever at least one of the 6264 bits in at least one of the 8000 blocks transmitted in one second is errored. Similarly, a severely errored second occurs when at least one bit in each of at least 2400 of the 8000 blocks transmitted in one second is errored.

While ATM quality of service parameters and SONET performance parameters indicate similar occurrences that are the result of errored bits, they have totally different definitions and they exist in different realms. Presently, since SONET network owners carry both ATM and non-ATM traffic and measure only code violations, errored seconds, and severely errored seconds, there is no way that a SONET network owner can guarantee with any degree of confidence any specified level of ATM quality of service parameters. Accordingly, it is an object of the present invention to provide a method of mapping measured SONET performance parameters to expected ATM quality of service parameters.

SUMMARY OF THE INVENTION

Briefly stated, the present invention provides a method of and system for processing ATM service requests to a SONET network, wherein the customer requesting the service has specified certain ATM quality of service parameters. The method includes calculating expected ATM quality of service parameters based on measured SONET performance parameters for an end-to-end path or connection through the SONET network. The system compares the calculated expected ATM quality of service parameters with the specified ATM quality of service parameters. Whenever at least one of the calculated expected ATM quality of service parameters is worse than the corresponding specified ATM quality of service parameter, the system rejects the path or connection. The system may then either test an alternate path through the network or not provide the service.

The ATM quality of service parameters include lost cells, errored cells, and severely errored cell blocks. The SONET performance parameters include errored seconds, and severely errored seconds. The system calculates an expected cell loss ratio based on the measured number of errored seconds and severely errored seconds for the path, an expected cell error ratio based on the measured number of errored seconds and severely errored seconds for the path, and an expected severely errored cell block ratio based on the measured number of errored seconds and severely errored seconds for the path.

The system estimates the probability that any bit transported over the path is in error and uses the estimated bit error probability in performing the various calculations. The system bases its estimate on the measured number of code violations for the path.

DESCRIPTION OF THE PREFERRED EMBODIMENT

Figure 1:
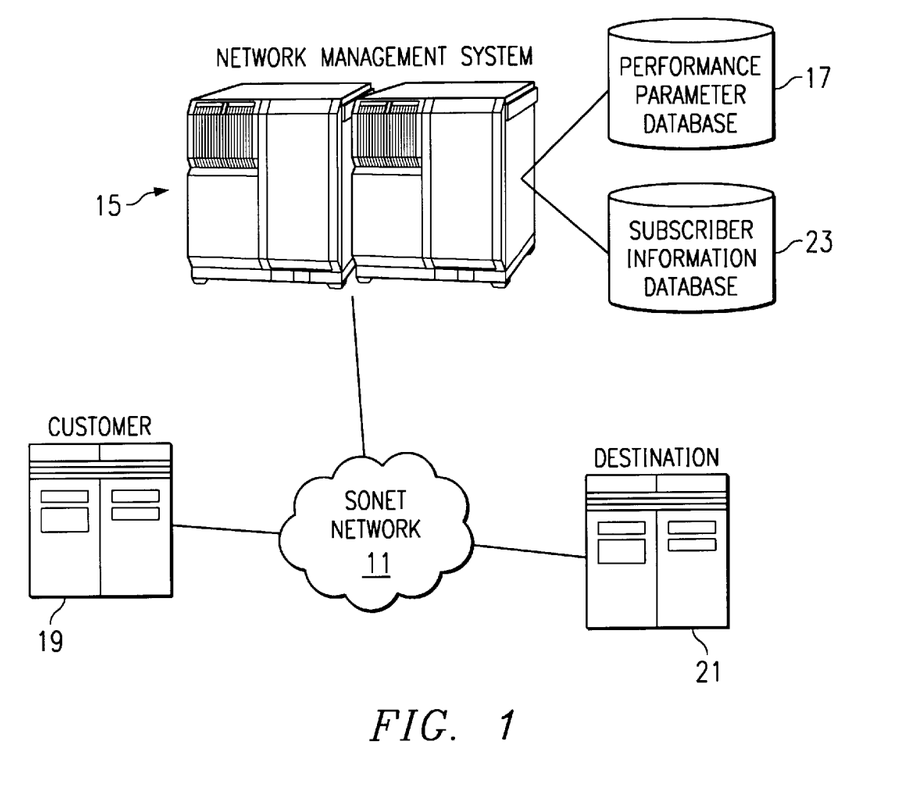
FIG. 1 is a block diagram of a SONET network according to the system of the present invention.

Referring now to the drawings, and first to FIG. 1, a SONET communications network is designated generally by the numeral 11. As is well known to those skilled in the art, SONET network 11 includes a plurality of high capacity broad band digital cross-connect switches (not shown). SONET network 11 also includes a network management system 15. Network management system 15 is connected to each switch of SONET network 11 by a data link. Network management system 15 sends commands to and receives messages from the switches over the data links. Network management system 15 control the switches thereby to route traffic through SONET network 11.

The switches of SONET network 11 collect and send to network management system 15 SONET performance parameter data. Each switch counts the number of code violations, errored seconds, and severely errored seconds that it observes and sends those numbers to network management system 15, where they are stored in a performance parameter database 17. With the data in performance parameter database 17, network management system 15 can determine the performance parameters for any path or connection through SONET network 11.

In FIG. 1, a customer 19 wishes to transport ATM data to a recipient 21 through SONET network 11. When a switch receives a request for service from customer 19, it sends a message to network management system 15. Network management system has access to a subscriber information database 23. Subscriber information database 23 contains data on each customer's requirements, including the customer's bandwidth and quality of service requirements.

Network management system 15 can define a path or connection through the network to destination 21 through network 11 via appropriate switches. With the information in performance parameter database 17, network management system 15 can determine the SONET performance parameters for that path. According to the present invention, network management system computes expected ATM quality of service parameters based upon the measured SONET performance parameter data contained in database 17. If the expected ATM quality of service parameters are worse that the quality of service parameters contained for the customer in subscriber database 23, network management system 15 will not route the data through that path or connection. Network management system 15 may either test an alternative connection or path through SONET network 11 or simply not accept the request for service. If the expected ATM performance parameters are better than those specified in subscriber information database 23, network management system 15 may accept the request for service based upon other factors, such as bandwidth availability.

The method of the present invention is based upon a random error model. Random errors occur in a SONET network due to a variety of factors, including transient voltage variations, spurious semiconductor and electronic noises, and radiation from natural terrestrial background sources and cosmic rays. Occasionally, a bit in a stream of data transmitted across a network may assume the wrong value due to the occurrence of random events in the network. While errored bits and bit error rates are not measured directly, it is estimated, based on code violations, that in SONET networks, the bit error rate due to random effects is in the range of $10^{-4}$ to $10^{-8}$ errored bits per transmitted bit. The method of the present invention does not account for cell loss due to delay or buffer overflow.

The following Tables 1 and 2 contain useful SONET terminology and definitions.

TABLE 1

| TERMINOLOGY | DEFINITION |
| --- | --- |
| Code Violation (cv) | The count of BIP violations. |
| Block (SONET) (Bs) | A set of consecutive bits associated with a connection. Each bit belongs to one and only one block. |
| SONET Block Size | SONET block size is bandwidth dependent. For STS-1, the block size is 6264 bits per block. Block size for STS-n is documented in ANSI T1.514. |
| Errored Block | A SONET block in which one or more bits are in error. |
| Errored Second (ES) | A one second period with one or more errored blocks. |
| Severely Errored Second (SES) | A one second period with 30% or more errored blocks. |

TABLE 2

| TERMINOLOGY | DEFINITION |
| --- | --- |
| ATM Cell Block ($C_B$) | A sequence of N cells transmitted consecutively on a given connection. |
| ATM Block Size (Ba) | The number N of ATM cells in a cell block. |
| Errored Cell | A cell received with one or more errored bits in its payload. |
| Lost Cell | A cell that fails to arrive within a specified time. |
| Severely Errored Cell Block (SECB) | An SECB occurs when more than M = N/32 errored cells or lost cell are observed in a received ATM cell Block. |

Referring to Table 2, an errored cell occurs when a cell is received with one or more errored bits in its payload. Thus, an ATM cell is errored when one or more bits out of 384 payload bits is errored. Conversely, an ATM cell is not errored if 0 bits out of 384 payload bits are errored. According to the binomial probability function, the probability P that n out of N events, each event having the probability p of occurring, is given by the formula $$P = \frac{N!}{n!(N-n)!} p^n (1-p)^{N-n}.$$

Thus, under the random error model, given a bit error rate of p, the probability of $p_p$ that any particular payload is not errored is $p_p = (1-p)^{384}$. Accordingly, the probability that any particular payload is errored is given by $$1-P_p = 1-(1-p)^{384}.$$

An ATM cell becomes lost if its header is errored. Since ATM cell headers have cyclic redundancy check (CRC) error correction code that can correct one errored bit, an ATM header is errored only if two or more bits out of 40 header bits is errored. Conversely, a header is not errored if zero or one of its bits are errored. Thus, according to the binomial probability function, the probability $p_0$ that zero header bits errored is given by $P_0=(1-p)^{40}$. Similarly, the probability $p_1$ that one header bit is errored is given by $$P_1 = 40 \cdot p \cdot (1-p)^{39}.$$

Thus, the probability $p_H$ that one or two header bits are errored is given by $$P_H = P_1 + P_2 = (1-p)^{40} + 40p\,(1-p)^{39}.$$

The probability that any cell will be lost is give by $$1 - p_H = 1 - [(1-p)^{40} + 40p\,(1-p)^{39}].$$

From the foregoing, it may be seen that if we knew the bit error rate, which is the probability that any bit will be in error, for a connection through the SONET network, we could calculate fairly easily the expected number of lost and errored cells. However, the number of errored bits are not counted. Rather, in the SONET realm, code violations, errored seconds, and severely errored seconds are counted. Accordingly, in the present invention, the expected numbers of lost and errored cells and severely errored cell blocks are calculated based on the measured numbers of errored cells and severely errored cells. The rigorous mathematical formulation for these calculations is as follows.

Let $N_b$ be the number of blocks in one second. It will be recalled that $N_b$ is a constant 8000 for all STS-n. Let $B_{s,1}$, $B_{s,2}, \ldots, B_{s,N_b}$ the Blocks within one second and let $C_1^k$, $\ldots, C_{N_k}^k$ be the ATM cells in block $B_{s,k}$. Furthermore, let p be the probability that one bit is in error. Under random error model, p is the bit error rate.

$$\text{let } X_j^k = \begin{cases} 1 & \text{if payload of } C_{N_k}^k \text{ is errored} \\ 0 & \text{else} \end{cases}.$$

Thus, $$X_j^k = \begin{cases} 1 & \text{with probability } 1 - (1-p)^{N_{cp}} \\ 0 & (1-p)^{N_{cp}} \end{cases},$$

Where $N_{cp}=384$ is the number of bits in ATM payload. Similarly, let $$Y_j^k = \begin{cases} 1 & \text{if payload header of } C_j^k \text{ has } \geq 2 \text{ errors} \\ 0 & \text{else} \end{cases},$$

thus, $$Y_j^k = \begin{cases} 1 & \text{with probability } 1 - p_H \\ 0 & p_H \end{cases},$$

where $$P_H = (1-p)^{N_{cH}} + N_{cH} \cdot p \cdot (1-P)^{N_{cH}},$$

where $N_H=40$ is the number of bits in ATM cell header.

Let $Z_k$ be the indicator function that block k is in error; thus, $$Z_k = \begin{cases} 1 & \text{if payload of } B^k \text{ is errored} \\ 0 & \text{else} \end{cases}.$$

Thus, $$Z_k \begin{cases} 1 & \text{with probability } 1 - p_B \\ 0 & p_B \end{cases},$$

where $P_B=(1-p)^{N_{Bs}}$; where $N_{Bs}$ is the block size in STS-n. For STS-1, $N_{Bs}=6,264$.

At this point, the errored seconds (ES) occurring may be defined as follows. Let W be the random variable denoting that an errored second (ES) event occurs. Thus, $$W = \begin{cases} 1 & \text{with probability } 1 - (p_B)^{N_b} \\ 0 & (p_B)^{N_b} \end{cases}$$

An ES event occurs if and only if at least one of the SONET blocks is errored.

With the above definitions, we may proceed with the mapping of ATM error parameters with SONET errored seconds.

Given the occurrence of one ES, how many ATM errored cells are expected to occur on average? This statement may be formulated mathematically as follows:

$$E\left(\sum_{k=1}^{N_b} \sum_{j=1}^{N_k} X_j^k \middle| W = 1\right) \quad (1)$$

Where $N_k$ is the number of ATM cells contained in SONET block k. The solution is presented in the following theorem:

Theorem 1: The expected number of occurrences of errored cells given that ES occurred is:

$$E\left(\sum_{k=1}^{N_b} \sum_{j=1}^{N_k} X_j^k \middle| W = 1\right) = \frac{N_k \cdot N_b [1 - (1-p)^{N_{cp}}]}{1 - (1-p)^{N_c \cdot N_k \cdot N_b}}$$

where $n=N_k \cdot N_b$ is the total number of ATM cells in all SONET blocks in one second; and $N_c$ is the number of bits in an ATM cell. In other words, the expected number of errored cells per errored second is number of cells per second by the probability that a payload is errored divided by the probability that there is at least one errored bit.

An ATM cell will be lost due to ES if and only if at least two bits in a cell-header are errored. The expected number of cells lost give that ES occurs can be formulated as follows:

$$E\left(\sum_{k=1}^{N_b} \sum_{j=1}^{N_k} X_j^k \middle| W = 1\right) \quad (2)$$

The following theorem presents the result of equation (2).

Theorem 2: The expected number of lost cells given the occurrence of one ES is as follows:

$$E\left(\sum_{k=1}^{N_b}\sum_{j=1}^{N_k} X_j^k \mid W=1\right) = \frac{N_b N_k[1-(1-p)^{N_{cH}} - N_{cH}(1-p)^{N_{cH}-1}p]}{1-(1-P)^{N_c N_k N_b}}$$

In other words, the expected number of lost cells per errored second is number of cells per second by the probability that a header is errored divided by the probability that there is at least one errored bit.

A severely errored cell block occurs when M out of N errored or lost cells are observed in one ATM cell block. Therefore, $$\text{Let } V_j^i = \begin{cases} 1 & \text{if cell } j \text{ in cell block } i \text{ is errored} \\ 0 & \text{else} \end{cases}$$

Lemma 1: Let $T_j^i = V_j^i | W=1$ be the random variable denoting the conditional error status of cell j in the $i_{th}$ cell block given that ES occurred. Then the probability distribution of $T_j^i$ is as follows:

$$T_j^i = \begin{cases} 1 & \text{with probability } p_a + p_b - (p_a \cdot p_b) \\ 0 & 1 - (p_a + p_b - (p_a \cdot p_b)) \end{cases}$$

where $$p_a = \frac{1-(1-p)^{N_{cP}}}{1-(1-p)^{N_c N_k N_b}}, \text{ and } p_b = \frac{[1-(1-p)^{N_{cH}} - N_{cH}(1-p)^{N_{cH}-1}p]}{1-(1-p)^{N_c N_k N_b}}.$$

Theorem: (Chernoff) Let $x_1, \ldots, x_n$ be a sequence of i.i.d (independent, identically distributed) random variable with moment generating function $$M(\theta) \overset{\Delta}{=} E(e^{\theta \cdot x_1}) < \infty,$$

let $$1(a) = \sup_\theta (\theta \cdot a - \log M(\theta)).$$

Then, for every $a > E(x_1)$, and positive integer n, we have $$\text{Prob }(x_1 + \ldots, x_n > na) = e^{-(n \cdot 1(a)) + o(n)} \approx e^{-(n \cdot 1(a))}.$$

Lemma 2: Let $x_1, \ldots, x_n$ be i.i.d Bernoulli random variable with parameter p. The, for p<a<1

$$\text{Prob }(x_1 + \ldots, x_n > na) \approx (p/a)^n.$$

Lemma 3: Let $U_i$ be the random variable denoting the severely errored status of $i^{th}$ cell block.
Thus, $$U_i = \begin{cases} 1 & \text{if cell block } i \text{ is severely errored} \\ 0 & \text{else} \end{cases}, \text{ then,}$$

$$U_i = \begin{cases} 1 & \text{with probability } \left(\frac{P_T \cdot N_C^b}{m}\right)^{N_C^b} \\ 0 & 1 - \left(\frac{P_T \cdot N_C^b}{m}\right)^{N_C^b} \end{cases}$$

where $P_T = p_a + p_b - (p_a \cdot p_b)$, for $0 < p_T < \frac{m}{N_C^B}$ and $N_C^B$ is the number of cells in one ATM block. The expected number of SECB occurrences given that one ES occurred can be computed as follows:

Theorem 3: Let $N_{cb}$ be the number of ATM cell blocks in one second. The expected number of Severely Errored Cell Blocks in one second given that ES occurred is:

$$E\left(\sum_{k=1}^{N_{cb}} U_i \mid W=1\right) \approx N_{cb} \cdot \left(\frac{p_T \cdot N_C^B}{m}\right)^{N_C^B}$$

Now, the expected number of errored cells, lost cells, and SECB of ATM performance parameters given the occurrence of one SONET SES can be calculated. From Table 1, it can be seen that a Severely Errored Second (SES) event occurs if and only if $$\sum_{i=1}^{N_B} Z_i \geq 0.3 \cdot N_B.$$

Based on the SES definition, the expected number of ATM quality of service parameters given the occurrence of one SES are derived as follows.

Given the occurrence of SES how many ATM errored cells are expected to occur on average? This statement may be formulated mathematically as follows:
To compute:

$$E\left(\sum_{k=1}^{N_b}\sum_{j=1}^{N_k} X_j^k \mid \sum_{i=1}^{N_b} Z_i \geq 0.3 \cdot N_b\right) \quad (1)$$

where $N_b = 8,000$

Theorem 4: The expected number of errored cells for a given SES occurrence is:

$$E\left(\sum_{k=1}^{N_b}\sum_{j=1}^{N_k} X_j^k \mid \sum_{i=1}^{N_b} Z_i \geq 0.3 \cdot N_b\right) \approx (N_b N_k) \frac{p_e^c a_2^{N_b}}{a_1^{(N_b-1)}(1-p_a)}$$

$$a_1 = \frac{0.3 \cdot N_b - 1}{N_b - 1}, a_2 = \frac{0.3 \cdot N_b}{N_b} = 0.3,$$

$$p_e^c = 1 - (1-p)^{N_{cP}}, \text{ and } p_B = (1-p)^{N_{Bs}}.$$

The expectation that an ATM cell will be lost due to an SES occurrence can be formulated as follows:

$$E\left(\sum_{k=1}^{N_b}\sum_{j=1}^{N_k} Y_j^k \mid \sum_{i=1}^{N_b} Z_i \geq 0.3 \cdot N_b\right) \quad (3)$$

The following theorem presents the result of equation (3).

Theorem 5: The expected number of lost cells given the occurrence of one SES is as follows:

$$E\left(\sum_{k=1}^{N_b}\sum_{j=1}^{N_k} Y_j^k \mid \sum_{i=1}^{N_b} Z_i \geq 0.3 \cdot N_b\right) = \frac{N_b N_k (1-p_H)(0.3)^{N_b}}{(a_1)^{(N_b-1)}(1-p_B)}$$

where $P_B = (1-p)^{N_B}$, $N_B$ is the number of bits in a SONET block; $P_H = (1-p)^{N_{cH}} + N_{cH} \cdot p \cdot (1-p)^{N_{cH}-1}$, $N_{cH}$ is the number of bits in ATM cell header, and $$a_1 = \frac{0.3 \cdot N_b - 1}{N_b - 1}.$$

The expected number of severely errored cell blocks, given the occurrence of one SONET SES, can be calculated as follows.
Let Let $V_j^i = \begin{cases} 1 & \text{if cell } j \text{ in cell block } i \text{ is errored or lost} \\ 0 & \text{else} \end{cases}$ and Lemma 4;

$$\text{Let } T_j^i = V_j^i \Big| \left( \sum_{i=1}^{N_b} Z_i \geq 0.3 \cdot N_b \right)$$

be the random variable denoting the conditional error status of cell j in the $i^{th}$ cell block given that SES occurred. Then the probability distribution of $T_j^i$ given that SES is as follows:

$$T_j^i = \begin{cases} 1 & \text{with probability } p_c + p_d - (p_c \cdot p_d) \\ 0 & 1 - (p_c + p_d - (p_c \cdot p_d)) \end{cases},$$

where $$p_c = \frac{p_e^c \cdot a_2^{N_b}}{a_1^{(N_b-1)}(1-p_B)}, \text{ and } p_d = \frac{(1-p_H) \cdot (0.3)^{N_b}}{(a_1)^{(N_b-1)} \cdot (1-p_B)}$$

where $p_H$, $p_B$, $a_1$, $a_2$ are defined in theorems 4 and 5 above.

Lemma 5: Let $U_i$ be the random variable denoting the severely errored status of $i^{th}$ cell block.
Thus, $$U_i = \begin{cases} 1 & \text{if cell block } i \text{ is severely errored} \\ 0 & \text{else} \end{cases}, \text{ then,}$$

$$U_i = \begin{cases} 1 & \text{with probability} \left(\frac{P_s \cdot N_c^b}{m}\right)^{N_c^b} \\ 0 & 1 - \left(\frac{P_s \cdot N_c^b}{m}\right)^{N_c^b} \end{cases}$$

where $P_s = p_c + p_d - (p_c \cdot p_d)$, for $0 < p_s < \frac{m}{N_c^B}$ and $N_C^B$ is the number of cells in one ATM cell block. The expected number of SECB occurrences given that one SES occurred can be computed in the following.

Theorem 6: Let $N_{cb}$ be the number of ATM cell blocks in one second. The expected number of Severely Errored Cell Blocks in one second given that SES occurred is:

$$E\left( \sum_{k=1}^{N_b} U_i \sum_{i=1}^{N_b} Z_i \geq 0.3 \cdot N_b \right) = N_{cb} \cdot \left(\frac{p_s \cdot N_c^B}{m}\right)^{N_c^B}.$$

It will be observed from the foregoing that p is a term in each of the equations. However, p is generally unknown. Accordingly, in order to perform the calculations, it is necessary to estimate p.

The bit error rate p can be estimated from the number of observed code violations for the path through the SONET network under investigation. Let U be the random variable denoting that a code violation has occurred. Thus, $$U = \begin{cases} 1 & \text{if } cv \text{ occurs.} \\ 0 & \text{else} \end{cases}$$

If k equals the number of bits in a row of a block, then $$U = \begin{cases} 1 & \text{with a probability } 1 - (1-p)^k \\ 0 & \text{with a probability } (1-p)^k \end{cases}.$$

Let $P_R = 1-(1-p)^k$, then the maximum likelihood estimator of PR is equal to the number of code violations observed over time divided by the number of rows transmitted over that time. Accordingly, $$\hat{p}_R = \frac{n_{cv}}{N_R}$$

where $N_{cv}$ is the number of code violations and $N_R$ is the number of rows in a specified period of time, e.g. fifteen minutes or one hour.

The probability of a code violation is a function of bit error rate p; namely, $P_R = 1-(1-p)^k$. Accordingly, the maximum likelihood estimator of p can be estimated by $$\frac{n_{cv}}{N_R} = 1 - (\hat{p})^k.$$

Therefore $$\hat{p} = 1 - \left(1 - \frac{n_{cv}}{N_R}\right)^{1/k},$$

where $\hat{p}$ is the maximum likelihood estimator of bit error rate p.

By substituting $\hat{p}$ for p, the respective numbers of errored cells, lost cells, and severely errored cell blocks can be calculated by the foregoing theorems. For example, the expected number of errored cells based on the observed number of errored seconds can be calculated from the result of Theorem 1. However, a severely errored second is by definition also an errored second. Accordingly, in order to avoid double counting, the expected number of errored cells based on errored seconds is equal to the result of Theorem 1 multiplied by the observed number of errored seconds less the observed number of severely errored seconds. Similarly, the expected number of errored cells based on the number of severely errored seconds is the result of Theorem 4 multiplied by the observed number of severely errored seconds. The total expected number of errored cells is thus the expected number of errored cells based on errored seconds plus the expected number of errored based on the observed number of severely errored seconds.

Figure 2A:
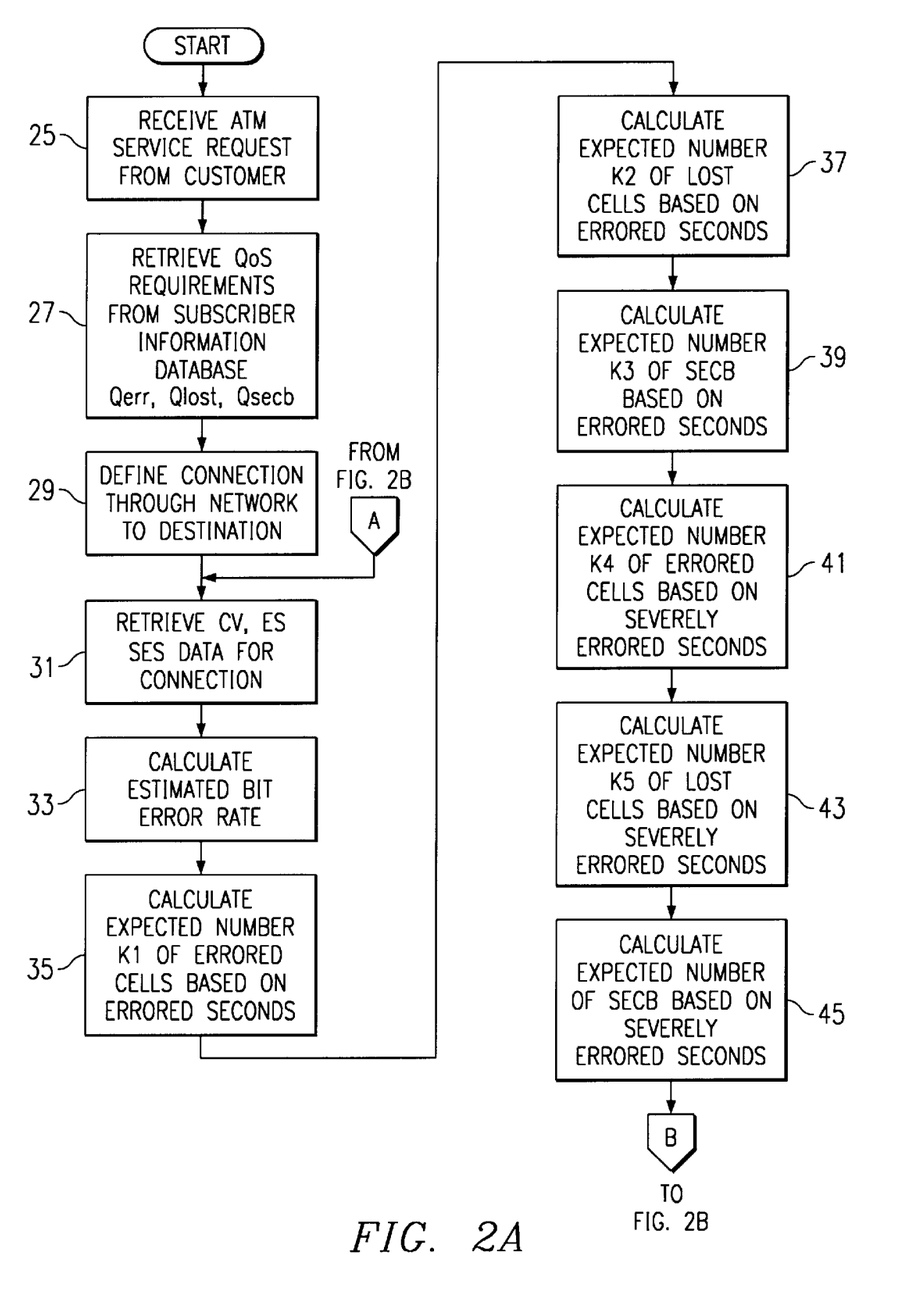
FIGS. 2A and 2B comprise a flow chart of a preferred implementation of the method of the present invention.

Referring now to FIG. 2A, there is shown a flow chart of a preferred software implementation of the method of the present invention, as performed in network management system 15 of FIG. 1. The system receives an ATM service request from a customer at block 25. The system then retrieves the quality of service requirements for the customer from subscriber information database 23 of FIG. 1 at block 27, and defines a connection through the network to the requested destination at block 29. Then the system retrieves the SONET performance parameter data for the connection from database 17 of FIG. 1, at block 31.

After having defined a connection through the network and having retrieved the quality of service requirements and the SONET performance data for the connection, the system maps the observed SONET performance parameters into a set of expected ATM quality of service parameters. First, an estimated bit error rate for the connection based on the observed number of code violations, at block 33. Then, the system calculates an expected number of errored cells based on the observed number of errored seconds at block 35. It will be recalled that the number of errored seconds includes the number of severely errored seconds. Accordingly, at block 35, the expected number of errored cells based on errored seconds is calculated by multiplying the number of errored seconds, less the number of severely errored seconds, by the result of Theorem 1, above. In similar fashion, the system calculates the expected number of lost cells based on observed errored seconds at block 37, and the expected number of severely errored cell blocks based on the observed number of errored seconds, at block 39.

Then, the system calculates the expected number of errored cells based on the observed number of severely errored seconds, at block 41, by multiplying the observed number of severely errored seconds by the result of Theorem 4, above. Similarly, the system calculates the expected number of lost cells based on severely errored seconds at block 43, and the expected number of severely errored cell blocks based on the observed number of severely errored cells at block 45.

Figure 2B:
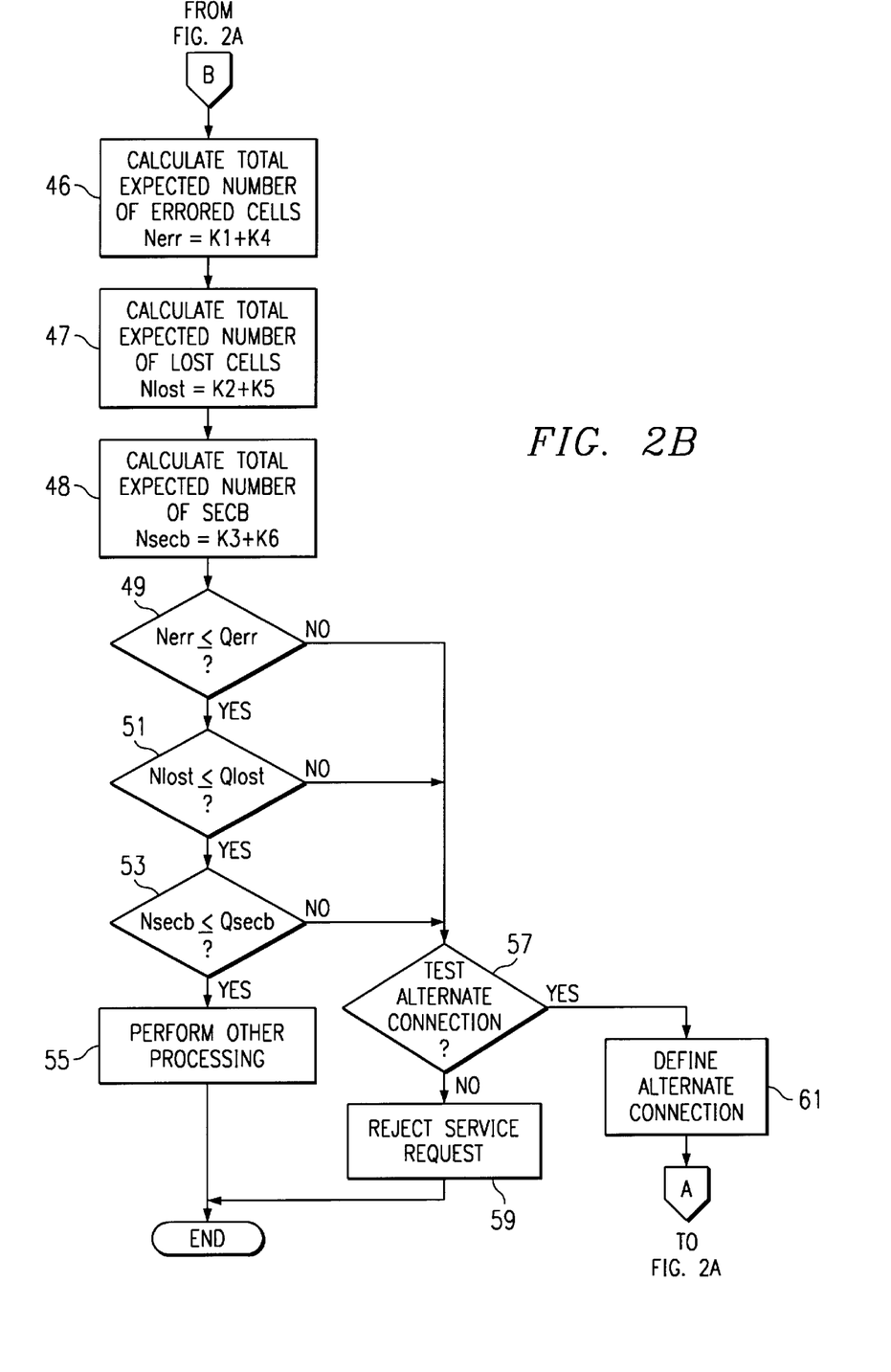

Referring now to FIG. 2B, after having calculated the expected quality of service parameters based on errored cells and severely errored cells, the system calculates the total expected quality of service parameters, at blocks 46–48. The total expected number of errored cells $N_{err}$ is equal to the result of block 35 plus the result of block 41. Similarly, the total expected number of lost cells $N_{lost}$ is equal to the result of block 37 plus the result of block 43. Finally, the total expected number of severely errored cell blocks $N_{secb}$ is equal to the result of block 39 plus the result of block 45.

Finally, the system tests whether or not the expected quality of service parameters are better than those specified by the customer. More specifically, the system tests at decision block 49 whether or not the expected number of errored cells is equal to or less than the specified number. If so, the system tests at decision block 51 whether or not the expected number of lost cells is equal to or less than the specified number. If so, the system tests at decision block 53 whether or not the expected number of severely errored cell blocks is less than or equal to the expected number. If so, the expected quality of service parameters are better than the specified quality of service parameters and the system performs other processing at block 55, which is not to say that the system accepts the service request. There may be other valid reasons, for example insufficient available bandwidth, not to accept the service request, which would be handled by other processing.

If any one of the tests of decision blocks 49–53 fails, then the connection cannot meet the customer's quality of service requirements. Accordingly, the system tests at decision block 57 whether or not to test an alternate connection. The test at decision block 57 may be based upon having already tested a certain number of alternate connections, or there being no other paths to test, or decision of the administrator of the system not to test alternative connections. In any event, if the decision at decision block 57 is not to test an alternative connection, then the system rejects the service request at block 59. Alternatively, the system defines an alternate connection at block 61 and returns to block 31 of FIG. 2A.

From the foregoing, it may be seen that the present invention is well adapted to overcome the shortcomings of the prior art. The present invention provides a method of and system for mapping SONET performance parameters to ATM quality of service parameters. Thus, the method and system of the present invention enable the owners or operators of SONET networks to determine whether or not various connections through the network can meet the quality of service requirements of ATM customers.

What is claimed is:

1. A method of processing ATM service requests to a SONET network, wherein the customer requesting the service has specified certain ATM quality of service parameters, which comprises the steps of:

calculating expected ATM quality of service parameters, said ATM quality of service parameters including lost cells, errored cells, and severely errored cell blocks, based on measured SONET performance parameters, said SONET performance parameters including errored seconds, and severely errored seconds, for said path through the SONET network;

comparing the calculated expected ATM quality of service parameters with the specified ATM quality of service parameters; and, rejecting the path whenever at least one of the calculated expected ATM quality of service parameters is worse than the corresponding specified ATM quality of service parameter.

2. The method as claimed in claim 1, wherein said step of calculating expected ATM quality of service parameters based on measured SONET performance parameters for a path through the SONET network includes the steps of:

calculating an expected number of lost cells based on the measured number of errored seconds and severely errored seconds for the path;

calculating an expected number of errored cells based on the measured number of errored seconds and severely errored seconds for the path; and, calculating an expected number of severely errored cell blocks based on the measured number of errored seconds and severely errored seconds for the path.

3. The method as claimed in claim 2, wherein said step of calculating an expected number of lost cells based on measured number of errored seconds and severely errored seconds for the path includes the steps of:

(a) calculating the expected number of lost cells based on the measured number of errored seconds;

(b) calculating the expected number of lost cells based on the measured number of severely errored seconds; and, (c) adding the result of step (a) to the result of step (b).

4. The method as claimed in claim 3, wherein the expected number $K_2$ of lost cells based on the number of measured errored second is given by:

$$K_2 = (ES - SES)\left(\frac{N_b N_k[1 - (1-p)^{N_{cH}} - pN_{cH}(1-p)^{N_{cH}-1}]}{1 - (1-p)^{N_c N_k N_b}}\right)$$

where:

ES=number of errored seconds,
SES=number of severely errored seconds,
$N_b$=number of SONET blocks per second,
$N_k$=number of ATM cells per SONET block,
$N_c$=number of bits per cell,
$N_{cH}$=number of bits in a cell header,
p=bit error rate.

5. The method as claimed in claim 3, wherein the expected number $K_5$ of lost cells based on the number of measured severely errored seconds is given by:

$$K_5 = (SES)\left(\frac{N_b N_k (1-P_H) \cdot (0.3)^{N_b}}{(a_1)^{(N_b-1)} \cdot (1-p_B)}\right)$$

where:
SES=number of severely errored seconds,
$N_b$=number of SONET blocks per second,
$N_k$=number of ATM cells per SONET blocks,
$P_H = (1-P)^{N_{cH}} + N_{cH} \cdot p \cdot (1-p)^{N_{cH}-1}$,
$P_B = (1-p)^{N_B}$
$N_{cH}$=number of bits in an ATM cell header,
$a_1$=(0.3).

6. The method as claimed in claim 2, wherein said step of calculating an expected number of errored cells based on the measured number of errored seconds and severely errored seconds for the path includes the steps of:

(a) calculating the expected number of errored cells based on the measured number of errored seconds;

(b) calculating the expected number of errored cells based on the measured number of severely errored seconds; and, (c) adding the result of step (a) to the result of step (b).

7. The method as claimed in claim 6, wherein the expected number $K_1$ of errored cells based on the number of measured errored seconds is given by:

$$K_1 = (ES - SES)\left(\frac{N_k N_b [1-(1-p)^{N_{cP}}]}{1-(1-p)^{N_c N_k N_b}}\right)$$

where:
ES=number of errored seconds,
SES=number of severely errored seconds,
$N_b$=number of SONET blocks per second,
$N_k$=number of ATM cells per SONET block,
$N_c$=number of bits per cell,
$N_{cP}$=number of bits in cell payload,
p=bit error rate.

8. The method as claimed in claim 6, wherein the expected number $K_4$ of errored cells based on the number of measured severely errored seconds is given by:

$$K_4 = (SES)(N_b \cdot N_k)\left(\frac{p_e^c \cdot a_2^{N_b}}{a_1^{(N_b-1)} \cdot (1-P_B)}\right)$$

where:
SES=number of severely errored seconds,
$N_b$=number of SONET blocks per second,
$N_k$=number of ATM cells per SONET blocks,
$P_B = (1-P)^{N_{Bs}}$,
$N_{Bs}$=number of bits in a SONET block,
p=bit error rate,
$a_1 =$ $$\frac{(0.3) \cdot N_b - 1}{N_b - 1}$$

$a_2 = 0.3$,
$P_e^c = 1-(1-p)^{N_{cp}}$,
$N_{cp}$=number of bits in a cell payload.

9. The method as claimed in claim 2, wherein said step of calculating an expected number of severely errored cell blocks based on the measured number of errored seconds and severely errored seconds for the path includes the steps of:

(a) calculating the expected number of severely errored cell blocks based on the measured number of errored seconds;

(b) calculating the expected number of severely errored cell blocks based on the measured number of severely errored seconds; and, (c) adding the result of step (a) to the result of step (b).

10. The method as claimed in claim 9, wherein the expected number $K_3$ of severely errored cell blocks based on the number of measured errored seconds is given by:

$$K_3 = (ES - SES) \cdot N_{cb} \cdot \left(P_T \cdot \frac{N_c^B}{m}\right)^{N_c^B}$$

where:
ES=number of errored seconds,
SES=number of severely errored seconds,
$N_{cb}$=number of ATM cell blocks in one second,
$P_T = P_a + P_b - (P_a \cdot P_b)$,
$P_a \leq$ $$\frac{1-(1-p)^{N_{cp}}}{1-(1-p)^{N_c N_k N_b}},$$

$P_b =$ $$\frac{[1-(1-p)^{N_{cH}} - N_{cH}(1-p)^{N_{cH}-1} \cdot p]}{1-(1-p)^{N_c N_k N_b}}$$

$N_{cH}$=number of bits in an ATM cell header,
$N_{cp}$=number of bits in an ATM cell payload,
$N_c$=number of bits per cell,
$N_k$=number of ATM cells per SONET block,
$N_b$=number of SONET blocks per second,
m=the bandwidth dependent SECB threshold,
$N_C^B$=number of cells in one ATM cell block.

11. The method as claimed in claim 9, wherein the expected number $K_6$ of severely errored cell blocks based on the number of measured severely errored seconds is given by:

$$K_6 = (SES) \cdot N_{cb} \cdot \left(\frac{P_s \cdot N_c^B}{m}\right)^{N_c^B}$$

where:
SES=number of severely errored seconds,
$N_{cb}$=number of ATM cell blocks in one second,
$P_S = P_c + P_d - (P_c \cdot P_d)$,
$P_c =$ $$\frac{P_e^c \cdot a_2^{N_b}}{a_1^{(N_b-1)} \cdot (1-P_B)}$$

$$P_d = \frac{(1-P_H) \cdot (0.3)^{N_b}}{a_1^{(N_b-1)} \cdot (1-P_B)}$$

$N_{cH}$=number of bits in an ATM cell header,
$N_{cp}$=number of bits in an ATM cell payload,
$N_c$=number of bits per cell,
$N_k$=number of ATM cells per SONET block,
$N_b$=number of SONET blocks per second,
m=bandwidth dependent SECB threshold.
$N_C^B$=number of cells in one ATM cell block, $$a_1 = \frac{0.3 \cdot N_b - 1}{N_b - 1},$$

$$a_2 = \frac{0.3 \cdot N_b}{N_b} = 0.3,$$

$P_B = (1-p)^{N_{Bs}}$,
$P_e^c = 1-(1-P)^{N_{cp}}$
P=bit error rate,
$N_{BS}$=number of bits in a SONET block.

12. The method as claimed in claim 1, wherein said step of calculating expected ATM quality of service parameters based on measured SONET performance parameters for a path through the SONET network includes the step of estimating the probability that any bit transported over the path is in error.

13. The method as claimed in claim 12, wherein said SONET measured performance parameters include code violations and said probability that any bit is in error is estimated based on the measured number of code violations for the path.

14. The method as claimed in claim 13, wherein the estimated probability $\hat{p}$ that any bit is errored is given by:

$$\hat{p} = 1 - \left(1 - \frac{n_{cv}}{N_R}\right)^{1/k},$$

where:
$n_{cv}$=number of code violations,
$N_R$=number of rows,
k=number of bits per row.

15. A method of processing ATM call service to a SONET network, wherein the customer requesting the service has specified certain ATM quality of service parameters, including maximum numbers of errored cells, lost cells, and severely errored cell blocks, and wherein the SONET network has errored second and severely errored second data, which comprises the steps of:

retrieving the number of errored seconds and severely errored seconds measured over a time period for a path through the SONET network;

calculating an expected number of lost cells based on the number of errored seconds and severely errored seconds measured for the path;

calculating an expected number of errored cells based on the number of errored seconds and severely errored seconds measured for the path;

calculating an expected number of severely errored cell blocks based on number of the errored seconds and severely errored seconds measured for the path;

comparing the expected number of lost cells with the specified maximum number of lost cells;

comparing the expected number of errored cells with the specified maximum number of errored cells;

comparing the expected number of severely errored cell blocks with the specified maximum number of severely errored cell blocks; and, rejecting the path whenever at least one of the expected numbers is greater than its corresponding specified maximum number.

16. A system for processing ATM call service to a SONET network, which comprises:

a network management system adapted to send commands to the SONET network to establish connections through the SONET network in response to requests for service, and to receive information from the SONET network including SONET performance parameter data for the network, including code violation, errored second, and severely errored second data;

a performance parameter data base for storing SONET performance data collected from the network;

a subscriber information database for storing information related to customers including ATM quality of service requirements, including errored cells, lost cells, and severely errored cell blocks;

means responsive to receipt of a request from a customer for ATM service for retrieving from said subscriber information database specified ATM quality of service requirements for said customer;

means for defining a path through said network;

means for retrieving from said performance parameter database the number of errored seconds and severely errored seconds for said path;

means for calculating an expected number of lost cells based on the number of errored seconds and severely errored seconds measured for the path;

means for calculating an expected number of errored cells based on the number of errored seconds and severely errored seconds measured for the path;

means for calculating an expected number of severely errored cell blocks based on number of the errored seconds and severely errored seconds measured for the path;

means for comparing the expected number of lost cells with the specified maximum number of lost cells;

means for comparing the expected number of errored cells with the specified maximum number of errored cells;

means for comparing the expected number of severely errored cell blocks with the specified maximum number of severely errored cell blocks; and, means for rejecting the path whenever at least one of the expected numbers is greater than its corresponding specified maximum number.

* * * * *